(12) United States Patent
Lee

(10) Patent No.: US 11,898,609 B1
(45) Date of Patent: Feb. 13, 2024

(54) WHEEL END DISCONNECT

(71) Applicant: Schaeffler Technologies AG & Co. KG, Herzogenaurach (DE)

(72) Inventor: Brian Lee, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/895,175

(22) Filed: Aug. 25, 2022

(51) Int. Cl.
  *F16D 11/14* (2006.01)
  *F16D 23/14* (2006.01)
  *B60B 27/02* (2006.01)

(52) U.S. Cl.
  CPC .............. *F16D 11/14* (2013.01); *B60B 27/02* (2013.01); *F16D 23/14* (2013.01); *B60B 2380/75* (2013.01)

(58) Field of Classification Search
  CPC .......... F16D 11/04; F16D 11/10; F16D 11/14; F16D 2011/002; F16D 23/12–14; B60B 2380/75
  See application file for complete search history.

(56) References Cited

U.S. PATENT DOCUMENTS

| 4,244,455 | A  | * | 1/1981 | Loker ..................... F16D 11/04 |
|---|---|---|---|---|
|  |  |  |  | 192/24 |
| 7,223,191 | B2 |  | 5/2007 | Aikawa et al. |
| 8,225,919 | B2 |  | 7/2012 | Harris et al. |
| 9,010,511 | B2 |  | 4/2015 | Eastman |
| 9,284,995 | B2 |  | 3/2016 | Lawson et al. |
| 9,731,597 | B2 |  | 8/2017 | Zink |
| 10,221,900 | B2 |  | 3/2019 | Heravi et al. |
| 10,535,458 | B2 |  | 1/2020 | Heravi et al. |
| 2019/0093712 | A1 | * | 3/2019 | Forsberg ................. B60K 6/40 |

FOREIGN PATENT DOCUMENTS

KR    2006095122 A    *    8/2006    ......... B60B 27/0078

* cited by examiner

*Primary Examiner* — David R Morris

(57) ABSTRACT

A wheel end disconnect assembly includes an axle shaft, a wheel hub, and a wheel end disconnect clutch. The axle shaft has a first dog clutch spline and the wheel hub has a second dog clutch spline. The wheel end disconnect clutch has a dog clutch sleeve and a rocker pin. The dog clutch sleeve has a third dog clutch spline engaged with one of the first or second dog clutch splines and arranged to selectively engage and disengage from the other of the first or second dog clutch splines, and a first spiral groove. The rocker pin has a first pin end arranged to selectively engage and disengage from the first spiral groove to axially displace the dog clutch sleeve. The first dog clutch spline and the second dog clutch spline may both be outer splines, and the third dog clutch spline may be an inner spline.

20 Claims, 4 Drawing Sheets

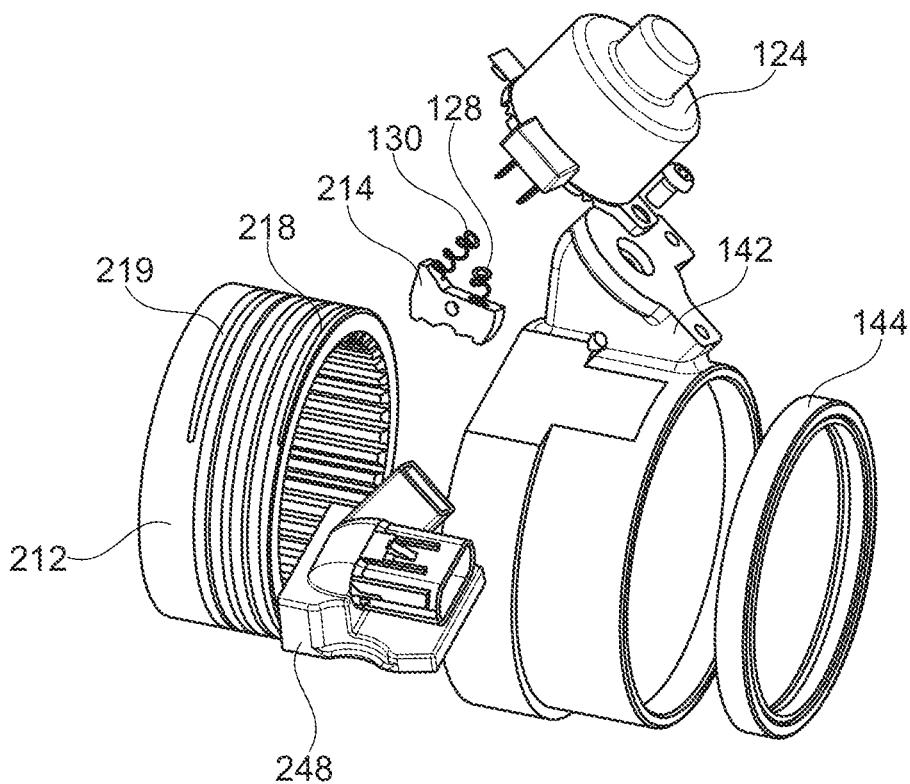
Fig. 7
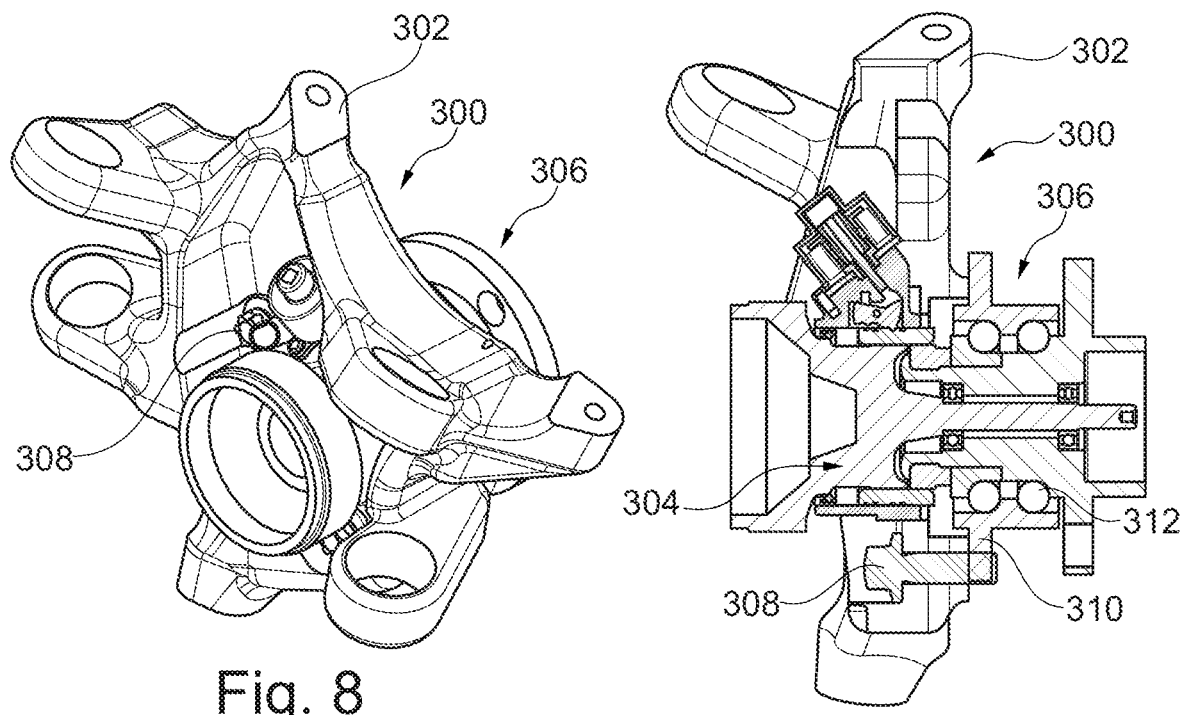
Fig. 8
Fig. 9 his# WHEEL END DISCONNECT

TECHNICAL FIELD

The present disclosure relates generally to a wheel end disconnect, and more specifically to a wheel clutch disconnect assembly having a dog clutch spline.

BACKGROUND

Wheel end disconnects are known. One example is shown and described in commonly-assigned U.S. Pat. No. 9,010,511 titled WHEEL DISCONNECT SYSTEM to Eastman, hereby incorporated by reference as if set forth fully herein.

SUMMARY

Example embodiments broadly comprise a wheel end disconnect assembly including an axle shaft, a wheel hub, and a wheel end disconnect clutch. The axle shaft has a first dog clutch spline and the wheel hub has a second dog clutch spline. The wheel end disconnect clutch has a dog clutch sleeve and a rocker pin. The dog clutch sleeve has a third dog clutch spline engaged with one of the first dog clutch spline or the second dog clutch spline and arranged to selectively engage and disengage from the other of the first dog clutch spline or the second dog clutch spline, and a first spiral groove. The rocker pin has a first pin end arranged to selectively engage and disengage from the first spiral groove to axially displace the dog clutch sleeve.

In an example embodiment, the first dog clutch spline and the second dog clutch spline are both outer splines, and the third dog clutch spline is an inner spline. In an example embodiment, the third dog clutch spline is arranged on an inner circumference of the dog clutch sleeve, and the first spiral groove is arranged on an outer circumference of the dog clutch sleeve. In an example embodiment, the dog clutch sleeve also has a first annular groove disposed at an axial end of the first spiral groove.

In some example embodiments, the wheel end disconnect clutch also includes a solenoid arranged to pivot or rock the rocker pin to engage the first pin end with the first spiral groove. In some example embodiments, the solenoid has a solenoid pin, and the wheel end disconnect clutch also includes a first spring arranged to pivot or rock the rocker pin to disengage the first pin end from the first spiral groove, and a second spring disposed between the solenoid pin and the rocker pin. In an example embodiment, the wheel end disconnect assembly also includes a rotation axis. The first spring is disposed normal to the rotation axis and the second spring is disposed at an angle relative to the rotation axis.

In some example embodiments, the wheel end disconnect assembly also includes a dog clutch spring. The axle shaft has a joint housing, the one of the first dog clutch spline or the second dog clutch spline is the first dog clutch spline, and the dog clutch spring is disposed axially between the joint housing and the dog clutch sleeve to urge the third dog clutch spline into engagement with the second dog clutch spline. In an example embodiment, when the first pin end is engaged with the first spiral groove, rotation of the axle shaft axially displaces the dog clutch sleeve to compress the dog clutch spring and disengage the third dog clutch spline from the second dog clutch spline. In an example embodiment, the wheel end disconnect assembly also includes a first bearing and a second bearing, and the wheel hub is rotatably supported on the axle shaft by the first bearing and the second bearing.

In some example embodiments, the wheel end disconnect assembly also includes a wheel end disconnect clutch housing and a seal that seals the wheel end disconnect clutch housing to the axle shaft. In an example embodiment, the wheel end disconnect assembly also includes a pivot pin installed in the wheel end disconnect clutch housing, and the rocker pin is arranged to pivot on the pivot pin. In an example embodiment, the wheel end disconnect assembly also includes a position sensor, fixed to the wheel end disconnect clutch housing, and arranged for determining an axial position of the dog clutch sleeve.

In some example embodiment, the dog clutch sleeve has a second spiral groove and the rocker pin has a second pin end arranged to selectively engage and disengage from the second spiral groove to axially displace the dog clutch sleeve. In an example embodiment, when the first pin end is engaged with the first spiral groove, rotation of the axle shaft axially displaces the dog clutch sleeve to disengage the third dog clutch spline from the second dog clutch spline, and when the second pin end is engaged with the second spiral groove, rotation of the axle shaft axially displaces the dog clutch sleeve to engage the third dog clutch spline with the second dog clutch spline.

Other example embodiments broadly comprise a knuckle assembly for a vehicle including the wheel end disconnect assembly and a knuckle including an aperture for receiving the wheel end disconnect assembly. The wheel end disconnect assembly is disposed in the aperture and the wheel hub is a component of a wheel hub assembly, the wheel hub assembly being bolted to the knuckle. In some example embodiments, the wheel hub assembly has a mounting hub and a roller bearing, the mounting hub is the portion of the wheel hub assembly bolted to the knuckle, and the wheel hub is supported in the mounting hub by the roller bearing. In an example embodiment, the roller bearing is a double row ball bearing.

BRIEF DESCRIPTION OF THE DRAWINGS

FIG. 7 shows an exploded view of the wheel end disconnect assembly of FIG. 5.

FIG. 8 shows a perspective view of a knuckle assembly incorporating the wheel end disconnect assembly of FIG. 5.

FIG. 9 shows a cross-sectional view of the knuckle assembly of FIG. 8.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
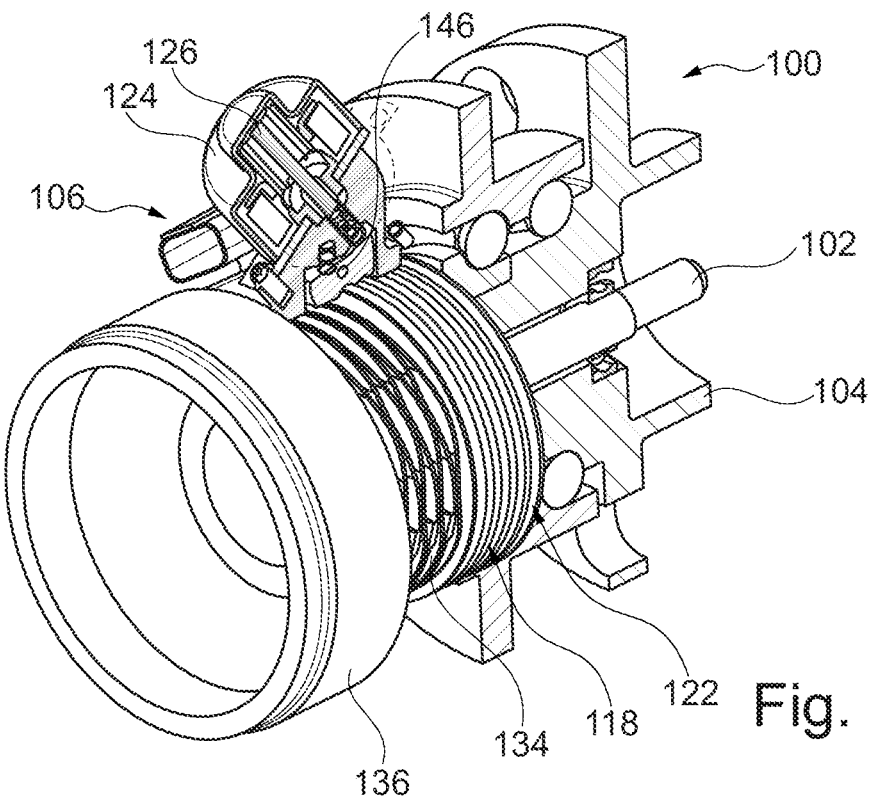
FIG. 1 illustrates a partially sectioned perspective view of a wheel end disconnect assembly according to a first embodiment, shown in an engaged position.
Figure 2:
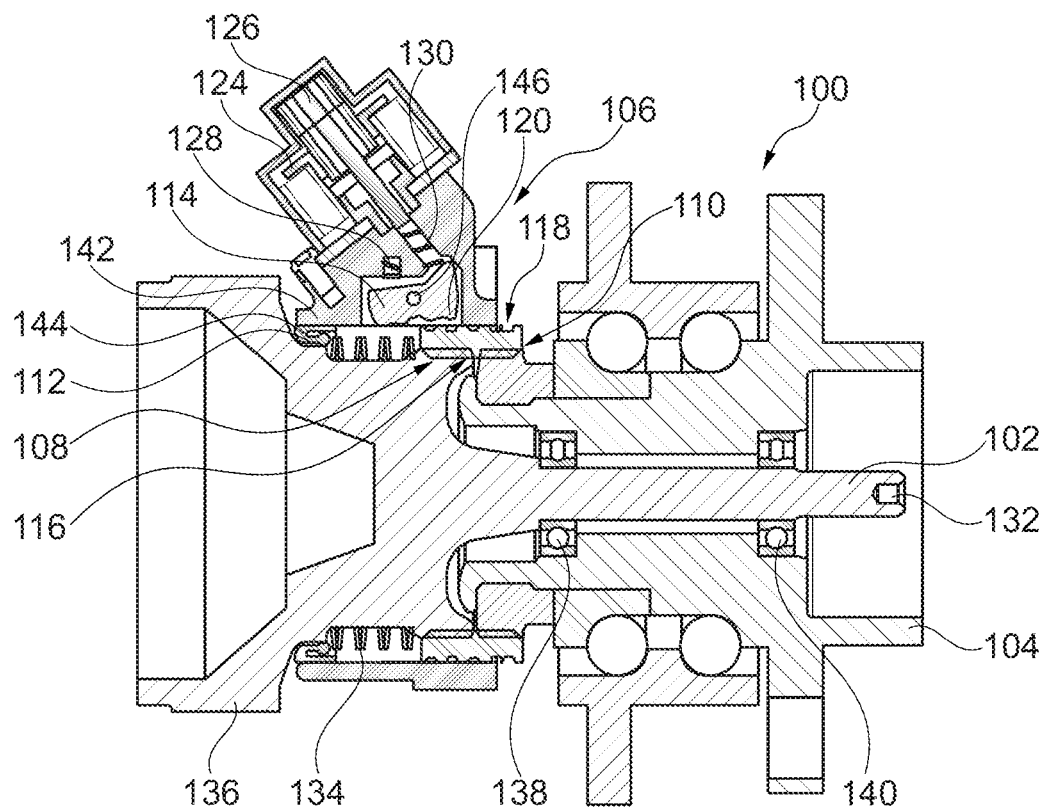
FIG. 2 illustrates a cross-sectional view of the wheel end disconnect assembly of FIG. 1, shown in an engaged position.

The following description is made with reference to FIGS. 1-2. FIG. 1 illustrates a partially sectioned perspective view of wheel end disconnect assembly 100, shown in an engaged position. FIG. 2 illustrates a cross-sectional view of wheel end disconnect assembly 100, shown in an engaged position.

Wheel end disconnect assembly 100 includes axle shaft 102, wheel hub 104 and wheel end disconnect clutch 106. The axle shaft includes dog clutch spline 108 and the wheel hub includes dog clutch spline 110. The wheel end disconnect clutch includes dog clutch sleeve 112 and rocker pin 114. The dog clutch sleeve has dog clutch spline 116 engaged with axle shaft spline 108 and arranged to selectively engage and disengage from wheel hub spline 110. It should be noted that other embodiments (not shown) may include spline 116 engaged with spline 110 and engageable with spline 108. The dog clutch sleeve also includes spiral groove 118 and the rocker pin includes pin end 120 arranged to selectively engage and disengage from spiral groove 118 to axially displace the dog clutch sleeve as described below.

Splines 108 and 110 are both outer spline and spline 116 is an inner spline. In other words, sleeve 112 is radially outside of the axle shaft and wheel hub splines. Dog clutch spline 116 is arranged on an inner circumference of dog clutch sleeve 112 and spiral groove 118 is arranged on an outer circumference of the dog clutch sleeve. Sleeve 112 also includes annular groove 122 disposed at an axial end of spiral groove 118.

Disconnect clutch 106 also includes solenoid 124 arranged to pivot or rock the rocker pin to engage pin end 120 with spiral groove 118. Solenoid 124 includes solenoid pin 126, and the disconnect clutch also includes spring 128 arranged to pivot or rock the rocker pin to disengage the pin end 120 from the first spiral groove, and spring 130 disposed between the solenoid pin and the rocker pin. Spring 128 is disposed normal to rotation axis 132 and spring 130 is disposed at an angle relative to the rotation axis. While spring 128 is shown normal to the axis, other embodiments (not shown) may include spring 128 disposed at an angle relative to the rotation axis. Wheel end disconnect assembly 100 also includes dog clutch spring 134. The axle shaft includes joint housing 136 and the dog clutch spring is disposed axially between the joint housing and the dog clutch sleeve to urge the dog clutch spline 116 into engagement with dog clutch spline 110.

Operation of wheel end disconnect assembly 100 will now be discussed. During normal operation, the dog clutch sleeve is engaged with spline 108 and spline 110 due to pressure from spring 134. That is, the spring exerts an axial force on the sleeve, pushing it to the right as shown in FIG. 2, for example. Therefore, torque received from the axle shaft is transmitted to the wheel hub and to a connected wheel (not shown). Spring 128 keeps rocker pin 114 rotated away from spiral groove 118 on the outer surface of sleeve 112.

Figure 3:
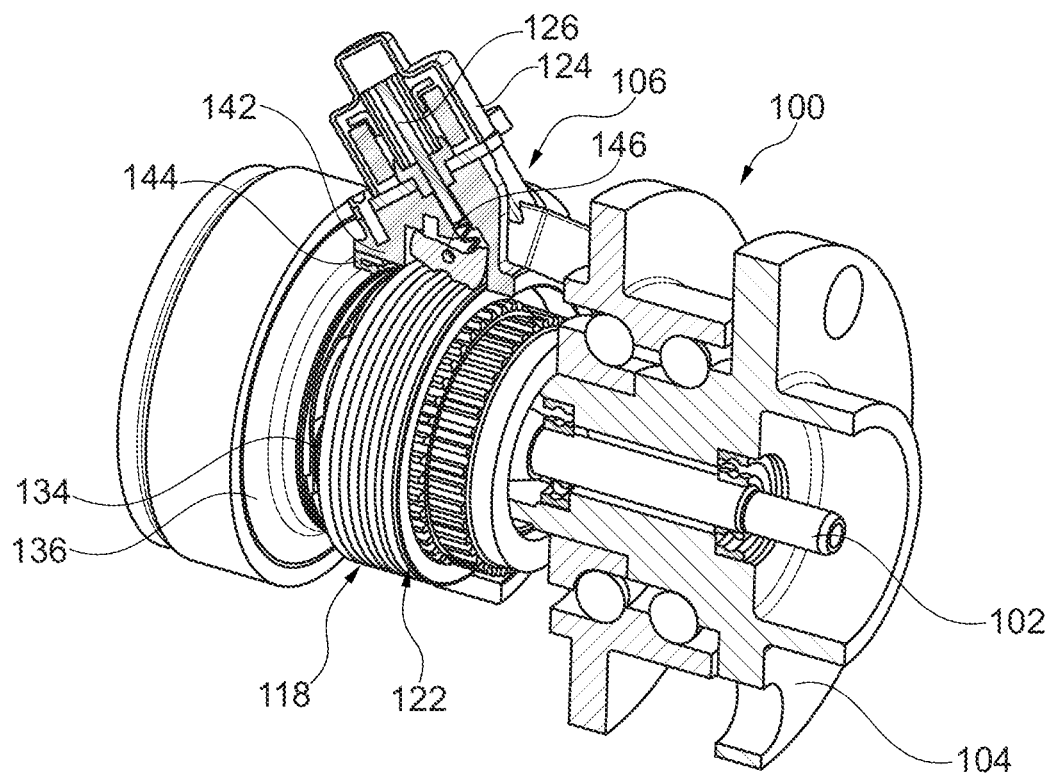
FIG. 3 illustrates a partially sectioned perspective view of the wheel end disconnect assembly of FIG. 1, shown in a disengaged position.
Figure 4:
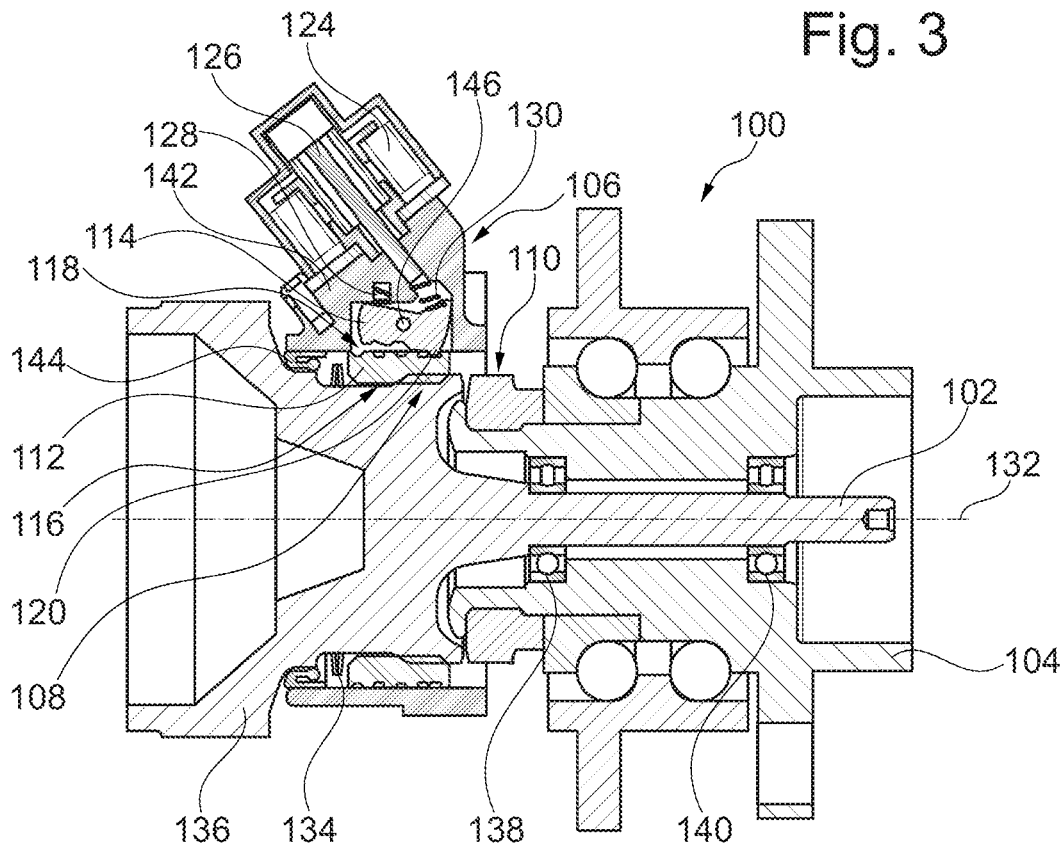
FIG. 4 illustrates a cross-sectional view of the wheel end disconnect assembly of FIG. 1, shown in a disengaged position.

The following description is made with reference to FIG. 1-4. FIG. 3 illustrates a partially sectioned perspective view of wheel end disconnect assembly 100, shown in a disengaged position. FIG. 4 illustrates a cross-sectional view of wheel end disconnect assembly 100, shown in a disengaged position. When disconnect is desired, the solenoid is actuated and pin 126 is extended, compressing spring 130 to overcome force of spring 128. When pin end 120 is aligned with a groove in spiral groove 118, the pin end engages the spiral groove. Spring 130 provides system resiliency to prevent damage if the pin end is not aligned with a groove when the solenoid pin is deployed. As the axle shaft continues to rotate, dog clutch sleeve 112 is forced to the left as shown in FIG. 4, for example, because the rocker pin is axially fixed and the pin end is traversing the spiral groove. Otherwise stated, when pin end 120 is engaged with spiral groove 118, rotation of the axle shaft axially displaces the dog clutch sleeve to compress the dog clutch spring and disengage the dog clutch spline 116 from dog clutch spline 110. Once the pin end reaches an axial limit of the spiral groove, the pin rides in annular groove 122, keeping the sleeve disengaged from the wheel hub but preventing further leftward movement of the sleeve.

When re-engagement is desired, power to the solenoid is removed, the solenoid pin retracts, spring 128 pivots the rocker pin so that the pin end is removed from the spiral groove, and spring 134 urges the sleeve to the right (as shown in FIG. 2, for example) to re-engage the sleeve (and axle shaft) with the wheel hub. It should be noted that solenoid 124 may have a latching magnetic circuit allowing power to be reduced after initial actuation.

Wheel end disconnect assembly 100 also includes bearings 138 and 140, wheel end disconnect clutch housing 142, and seal 144. The wheel hub is rotatably supported on the axle shaft by bearings 138 and 140, and seal 144 seals housing 142 to axle shaft 102. Wheel end disconnect assembly also includes pivot pin 146 installed in housing 142, and the rocker pin is arranged to pivot on the pivot pin. In other words, the pin extends through a hole in the rocker pin to provide a pivot point as the rocker pin rotates to engage and disengage pin end 120 with spiral groove 118.

Figure 5:
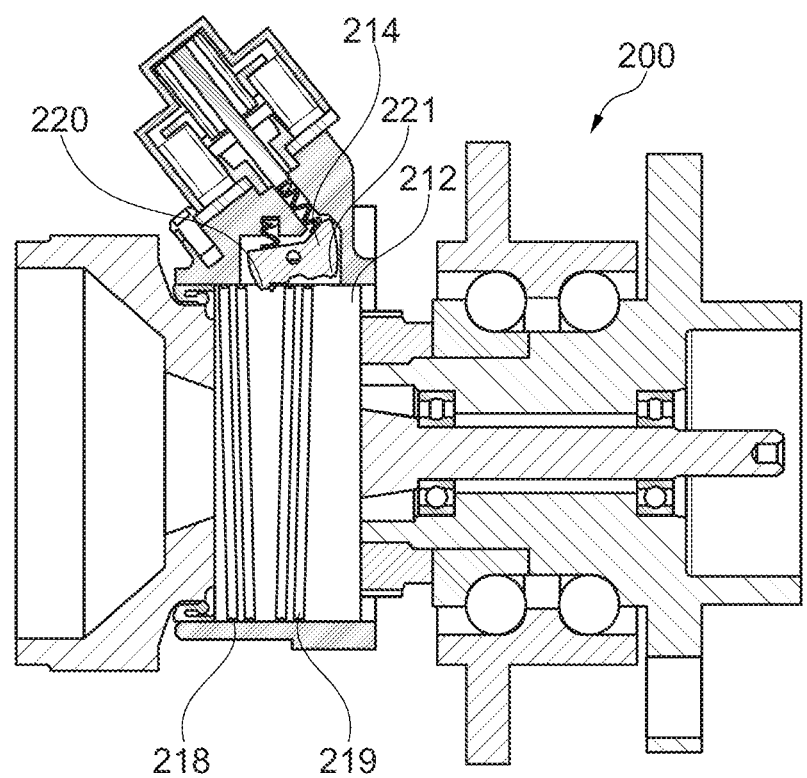
FIG. 5 illustrates a partially sectioned side view of a wheel end disconnect assembly according to a second embodiment, shown in a disengaged position.
Figure 6:
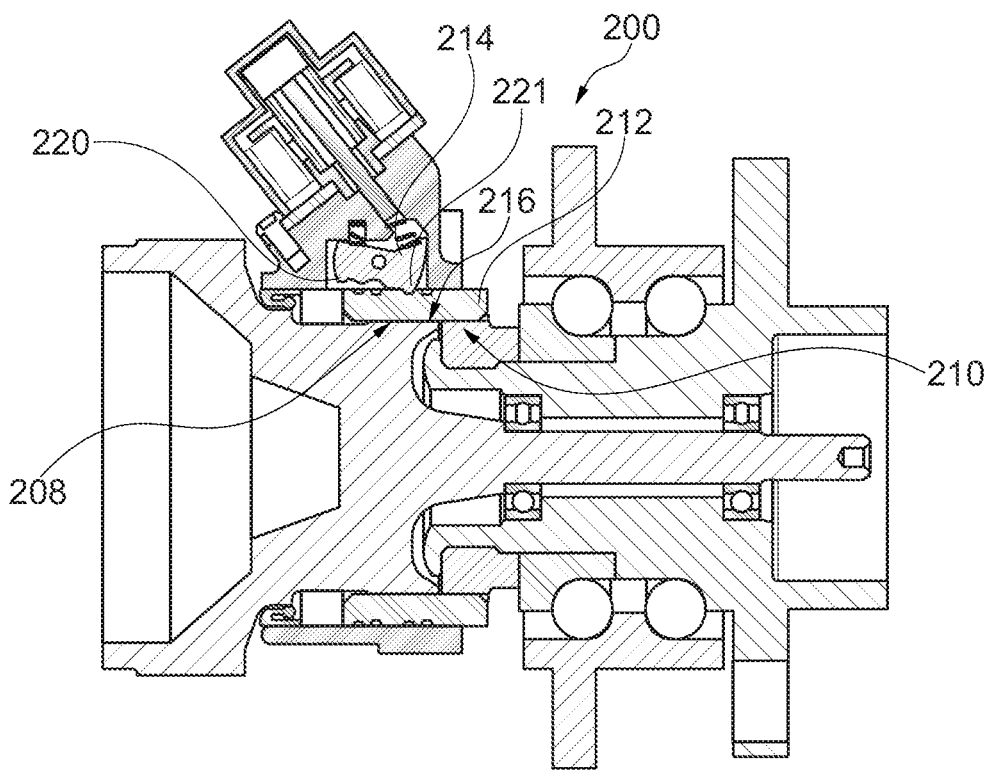
FIG. 6 illustrates a cross-sectional view of the wheel end disconnect assembly of FIG. 5 shown in an engaged position.

The following description is made with reference to FIGS. 5-6. FIG. 5 illustrates a partially sectioned side view of wheel end disconnect assembly 200, shown in a disengaged position. FIG. 6 illustrates a cross-sectional view of wheel end disconnect assembly 200, shown in an engaged position. Disconnect assembly 200 is similar to disconnect assembly 100 and 2XX reference numerals generally correspond to 1XX reference numerals, except as described below. It should be noted that assembly 200 does not include a dog clutch spring.

Dog clutch sleeve 212 includes spiral groove 218 and spiral groove 219, and rocker pin 214 includes pin end 220 and pin end 221. Pin end 221 is arranged to selectively engage and disengage from spiral groove 219 to axially displace the dog clutch sleeve. Similar to operation of wheel end disconnect assembly 100 described above, when pin end 220 is engaged with spiral groove 218 (ref. FIG. 5), rotation of the axle shaft axially displaces the dog clutch sleeve (to the left in FIG. 5, for example) to disengage dog clutch spline 216 from dog clutch spline 219. When the pin end 221 is engaged with spiral groove 219 (ref FIG. 6), rotation of the axle shaft axially displaces the dog clutch sleeve (to the right in FIG. 6, for example) to engage dog clutch spline 216 with dog clutch spline 210. It should be noted that, depending on whether the vehicle is traveling in a forward or reverse direction, operation of wheel end disconnect assembly 200 may be reversed. In other words, if the vehicle is moving in reverse, engaging pin end 220 with spiral groove 218 would engage the dog clutch sleeve with the axle shaft, and engaging pin end 221 with spiral groove 219 would disengage the dog clutch sleeve from the axle shaft. A control circuit (not shown) for the wheel end disconnect assembly may use vehicle traveling direction as an input to a control algorithm for operating the solenoid, for example.

The following description is made with reference to FIG. 7. FIG. 7 shows an exploded view of wheel end disconnect assembly 200. Wheel end disconnect assembly 200 also includes position sensor 248, fixed to the wheel end disconnect clutch housing, and arranged for determining an axial position of the dog clutch sleeve. The position sensor may be used to confirm a position of the dog clutch sleeve in a control algorithm and/or determine if a component failure has occurred, for example.

The following description is made with reference to FIGS. 8-9. FIG. 8 shows a perspective view of knuckle assembly 300 incorporating wheel end disconnect assembly 200. FIG. 9 shows a cross-sectional view of knuckle assembly 300. Knuckle assembly 300 may be a front or rear knuckle assembly for a vehicle, for example. Knuckle assembly 300 includes wheel end disconnect assembly 200 and knuckle 302 with aperture 304 for receiving the wheel end disconnect assembly. The wheel end disconnect assembly is disposed in the aperture and the wheel hub is a component of wheel hub assembly 306. The wheel hub assembly is bolted to the knuckle 302 with bolts 308, for example. Wheel hub assembly 306 includes mounting hub 310 roller bearing 312. The mounting hub is the portion of the wheel hub assembly bolted to the knuckle and the wheel hub is supported in the mounting hub by the roller bearing. In the embodiment shown, the roller bearing is a double row ball bearing.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Wheel end disconnect assembly
102 Axle shaft
104 Wheel hub
106 Wheel end disconnect clutch
108 Dog clutch spline (first, axle shaft)
110 Dog clutch spline (second, wheel hub)
112 Dog clutch sleeve
114 Rocker pin
116 Dog clutch spline (third, sleeve)
118 Spiral groove (first)
120 Pin end (first)
122 Annular groove (first)
124 Solenoid
126 Solenoid pin
128 Spring (first)
130 Spring (second)
132 Rotation axis
134 Dog clutch spring
136 Joint housing (axle shaft)
138 Bearing (first)
140 Bearing (second)
142 Wheel end disconnect clutch housing
144 Seal
146 Pivot pin
200 Wheel end disconnect assembly
208 Dog clutch spline (first, axle shaft)
210 Dog clutch spline (second, wheel hub)
212 Dog clutch sleeve
214 Rocker pin
216 Dog clutch spline (third, sleeve)
218 Spiral groove (first)
219 Spiral groove (second)
220 Pin end (first)
221 Pin end (second)
248 Position sensor
300 Knuckle assembly
302 Knuckle
304 Aperture
306 Wheel hub assembly
308 Bolts
310 Mounting hub
312 Roller bearing

What is claimed is:
1. A wheel end disconnect assembly, comprising:
an axle shaft comprising a first dog clutch spline;
a wheel hub comprising a second dog clutch spline; and
a wheel end disconnect clutch comprising:
 a dog clutch sleeve comprising:
  a third dog clutch spline engaged with one of the first dog clutch spline or the second dog clutch spline and arranged to selectively engage and disengage from the other of the first dog clutch spline or the second dog clutch spline; and
a first spiral groove;
a solenoid comprising a solenoid pin;
a rocker pin comprising a first pin end arranged to selectively engage and disengage from the first spiral groove to axially displace the dog clutch sleeve;
a first spring arranged to pivot or rock the rocker pin to disengage the first pin end from the first spiral groove; and
a second spring disposed between the solenoid pin and the rocker pin, wherein the solenoid is arranged to pivot or rock the rocker pin to engage the first pin end with the first spiral groove.

2. The wheel end disconnect assembly of claim 1 wherein:
the first dog clutch spline and the second dog clutch spline are both outer splines; and
the third dog clutch spline is an inner spline.

3. The wheel end disconnect assembly of claim 1 wherein:
the third dog clutch spline is arranged on an inner circumference of the dog clutch sleeve; and
the first spiral groove is arranged on an outer circumference of the dog clutch sleeve.

4. The wheel end disconnect assembly of claim 1 wherein the dog clutch sleeve further comprises a first annular groove disposed at an axial end of the first spiral groove.

5. The wheel end disconnect assembly of claim 1 further comprising a rotation axis, wherein:
the first spring is disposed normal to the rotation axis; and
the second spring is disposed at an angle relative to the rotation axis.

6. The wheel end disconnect assembly of claim 1 further comprising a dog clutch spring, wherein:
the axle shaft comprises a joint housing;
the one of the first dog clutch spline or the second dog clutch spline is the first dog clutch spline; and
the dog clutch spring is disposed axially between the joint housing and the dog clutch sleeve to urge the third dog clutch spline into engagement with the second dog clutch spline.

7. The wheel end disconnect assembly of claim 6 wherein, when the first pin end is engaged with the first spiral groove, rotation of the axle shaft axially displaces the dog clutch sleeve to compress the dog clutch spring and disengage the third dog clutch spline from the second dog clutch spline.

8. The wheel end disconnect assembly of claim 1 further comprising:
a first bearing; and
a second bearing, wherein the wheel hub is rotatably supported on the axle shaft by the first bearing and the second bearing.

9. The wheel end disconnect assembly of claim 1 further comprising:
a wheel end disconnect clutch housing, and
a seal that seals the wheel end disconnect clutch housing to the axle shaft.

10. The wheel end disconnect assembly of claim 1 wherein:
the dog clutch sleeve comprises a second spiral groove; and
the rocker pin comprises a second pin end arranged to selectively engage and disengage from the second spiral groove to axially displace the dog clutch sleeve.

11. The wheel end disconnect assembly of claim 10 wherein:
when the first pin end is engaged with the first spiral groove, rotation of the axle shaft axially displaces the dog clutch sleeve to disengage the third dog clutch spline from the second dog clutch spline; and
when the second pin end is engaged with the second spiral groove, rotation of the axle shaft axially displaces the dog clutch sleeve to engage the third dog clutch spline with the second dog clutch spline.

12. A knuckle assembly for a vehicle comprising:
the wheel end disconnect assembly of claim 1; and
a knuckle comprising an aperture for receiving the wheel end disconnect assembly, wherein:
the wheel end disconnect assembly is disposed in the aperture; and
the wheel hub is a component of a wheel hub assembly, the wheel hub assembly being bolted to the knuckle.

13. The knuckle assembly of claim 12 wherein:
the wheel hub assembly comprises a mounting hub and a roller bearing;
the mounting hub is the portion of the wheel hub assembly bolted to the knuckle; and
the wheel hub is supported in the mounting hub by the roller bearing.

14. A wheel end disconnect assembly, comprising:
an axle shaft comprising a first dog clutch spline;
a wheel hub comprising a second dog clutch spline;
a wheel end disconnect clutch comprising:
a dog clutch sleeve comprising:
a third dog clutch spline engaged with one of the first dog clutch spline or the second dog clutch spline and arranged to selectively engage and disengage from the other of the first dog clutch spline or the second dog clutch spline; and
a first spiral groove; and
a rocker pin comprising a first pin end arranged to selectively engage and disengage from the first spiral groove to axially displace the dog clutch sleeve;
a wheel end disconnect clutch housing; and
a pivot pin installed in the wheel end disconnect clutch housing, wherein the rocker pin is arranged to pivot on the pivot pin.

15. The wheel end disconnect assembly of claim 14 further comprising a position sensor, fixed to the wheel end disconnect clutch housing, and arranged for determining an axial position of the dog clutch sleeve.

16. A wheel end disconnect assembly, comprising:
an axle shaft comprising a first dog clutch spline;
a wheel hub comprising a second dog clutch spline; and
a wheel end disconnect clutch comprising:
a dog clutch sleeve comprising:
a third dog clutch spline engaged with one of the first dog clutch spline or the second dog clutch spline and arranged to selectively engage and disengage from the other of the first dog clutch spline or the second dog clutch spline; and
a first spiral groove;
a pivot pin; and
a rocker pin arranged to pivot on the pivot pin, the rocker pin comprising a first pin end arranged to selectively engage and disengage from the first spiral groove to axially displace the dog clutch sleeve.

17. The wheel end disconnect assembly of claim 16 wherein the wheel end disconnect clutch further comprises a solenoid arranged to pivot or rock the rocker pin to engage the first pin end with the first spiral groove.

18. The wheel end disconnect assembly of claim 17 wherein:
the solenoid comprises a solenoid pin; and
the wheel end disconnect clutch further comprises:

a first spring arranged to pivot the rocker pin to disengage the first pin end from the first spiral groove; and a second spring disposed between the solenoid pin and the rocker pin.

19. The wheel end disconnect assembly of claim 16 further comprising a dog clutch spring, wherein:

the axle shaft comprises a joint housing;

the one of the first dog clutch spline or the second dog clutch spline is the first dog clutch spline; and the dog clutch spring is disposed axially between the joint housing and the dog clutch sleeve to urge the third dog clutch spline into engagement with the second dog clutch spline.

20. The wheel end disconnect assembly of claim 19 wherein, when the first pin end is engaged with the first spiral groove, rotation of the axle shaft axially displaces the dog clutch sleeve to compress the dog clutch spring and disengage the third dog clutch spline from the second dog clutch spline.

\* \* \* \* \*